(12) United States Patent
Bostick et al.

(10) Patent No.: US 8,243,901 B2
(45) Date of Patent: Aug. 14, 2012

(54) SECURING TELECONFERENCES WITH UNIQUE, SINGLE-USE PASSCODES

(75) Inventors: James E. Bostick, Cedar Park, TX (US); Randolph M. Forlenza, Austin, TX (US); John P. Kaemmerer, Pflugerville, TX (US); Raghuraman Kalyanaraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 11/532,130

(22) Filed: Sep. 15, 2006

(65) Prior Publication Data

US 2008/0069328 A1 Mar. 20, 2008

(51) Int. Cl.
*H04M 3/42* (2006.01)
(52) U.S. Cl. .................................................. 379/202.01
(58) Field of Classification Search ............. 379/202.01; 709/204; 370/261, 260; 434/350
See application file for complete search history.

(56) References Cited

U.S. PATENT DOCUMENTS

| | | | |
|---|---|---|---|
| 6,563,914 B2 | 5/2003 | Sammon et al. | |
| 6,798,753 B1 | 9/2004 | Doganata et al. | |
| 7,010,107 B1 | 3/2006 | Lee et al. | |
| 7,640,303 B2* | 12/2009 | Blumofe | 709/204 |
| 2001/0049087 A1* | 12/2001 | Hale | 434/350 |
| 2002/0122391 A1* | 9/2002 | Shalit | 370/260 |
| 2004/0054724 A1 | 3/2004 | Sudo | |
| 2004/0234058 A1* | 11/2004 | Darby et al. | 379/202.01 |
| 2005/0180342 A1* | 8/2005 | Summers et al. | 370/261 |
| 2005/0212908 A1 | 9/2005 | Rodman et al. | |
| 2006/0088152 A1* | 4/2006 | Green et al. | 379/202.01 |
| 2006/0210044 A1* | 9/2006 | Widger | 379/202.01 |
| 2007/0273474 A1* | 11/2007 | Levine | 340/5.28 |

* cited by examiner

*Primary Examiner* — Ahmad Matar
*Assistant Examiner* — Sonia Gay
(74) *Attorney, Agent, or Firm* — Yee & Associates, P.C.; Mark C. Vallone

(57) ABSTRACT

A Single-Use Passcode Generator (SUPG) gives an existing teleconference management software the capability to generate a unique, single-use passcode for each of a plurality of invited participants to a teleconference. When a host sets up a teleconference, a unique passcode is generated for each invited participant. The unique passcode is sent with a teleconference invitation. The unique passcode expires once the invited participants access the teleconference.

19 Claims, 5 Drawing Sheets

SECURING TELECONFERENCES WITH UNIQUE, SINGLE-USE PASSCODES

FIELD OF THE INVENTION

The present invention relates generally to telecommunications and teleconferencing, and relates specifically to assigning single-use passcodes to participants in a teleconference.

BACKGROUND OF THE INVENTION

Teleconferencing is cheaper than travel for holding meetings, particularly when many participants are involved. Manually setting up a teleconference is a cumbersome procedure, even with the most advanced corporate phone systems. It has become commonplace for companies to use third party teleconference service providers to set up conference calls. In addition to convenient set-up, third party teleconference providers offer enhanced features, such as a moderator, operator assistance, roll-call, voice recording, and transcriptions. Third party providers usually employ Internet-based account access, which includes teleconference scheduling, contact lists, and automated invitations. Teleconference scheduling software that integrates with common desktop e-mail, contact lists, and scheduling software such as LOTUS NOTES or OUTLOOK EXCHANGE are known in the art.

The procedures for establishing a teleconference are typically that a "host" contacts a third party provider through the Internet to set-up an account, and the third party provider assigns a phone number and two passcodes for the account. One passcode is assigned for participants and gives access to scheduled teleconferences. The other passcode is for the host, and provides permissions to perform special functions such as initiating a teleconference, purchasing additional features, allowing late arrivals to access the teleconference, and preventing conversation between participants until the teleconference starts. The host sets up a teleconference, designating a time and identifying invitees with the third party provider's scheduling software. The host or the third party sends invitations to the invited participants with the call-in phone number and the passcode. During the pre-conference dial-in period, participants call the assigned call-in number and give the passcode at the prompt. The third party provider verifies the passcode and connects each caller to the teleconference. Once the teleconference has started, participants are generally not allowed to join the conference late unless the host has made special accommodations. Late access usually requires intervention by the host, a moderator, or operator.

Passcodes and the teleconference phone number are generally assigned to the company which is the account holder and not necessarily to a particular person. The teleconference phone number and passcodes are used to charge the account holder for the teleconference services. Over time, as different participants engage in teleconferences, the passcodes become common knowledge. Even host passcodes become known as they are shared by well-intentioned coworkers to accommodate late arrivals or substitute hosts. Well known passcodes can lead to unauthorized use or eavesdropping. When teleconference participants include non-employees or customers, the security risks associated with well known passcodes are even higher. A need exists for a way to increase the security of teleconferences by assigning unique, single-use passcodes to each invited participant of a teleconference. These and other objects of the invention will be apparent to those skilled in the art from the following detailed description of a preferred embodiment of the invention.

SUMMARY OF THE INVENTION

A Single-Use Passcode Generator (SUPG) enhances existing teleconference management software by adding the capability to generate unique, single-use passcodes for invited participants of a teleconference. When a host sets up a teleconference, a unique passcode is generated for each invited participant. The passcode is sent with a teleconference invitation. The passcode expires once the invited participants access the teleconference.

Hosts and other frequent registered users of the teleconference account often have permanent passcodes. SUPG accommodates invited participants with existing personal permanent passcodes to use their permanent code. Because all teleconference invitees are assigned individual passcodes, participants with permanent codes do not need to share their code with others. Likewise, participants with permanent passcodes who are not invited to a teleconference, will not be granted access. Further, hosts can request creation of a 'generic' passcode for a teleconference that allows multiple participants to access the teleconference. Generic passcodes are particularly useful for participants who do not have e-mail, or for situations where unknown participants are expected, such as large corporate broadcasts.

Hosts can designate passcode duration. Passcodes can remain valid for the entire teleconference or just during the pre-conference dial-in period. The host can add a fixed period of time before the teleconference for preliminary discussion and after the teleconference for follow-up discussions. The host can also configure the passcodes to allow participants to leave and return, and allow disconnected participants to rejoin without host, moderator or operator intervention.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Single-Use Passcode Generator (SUPG).

Figure 1:
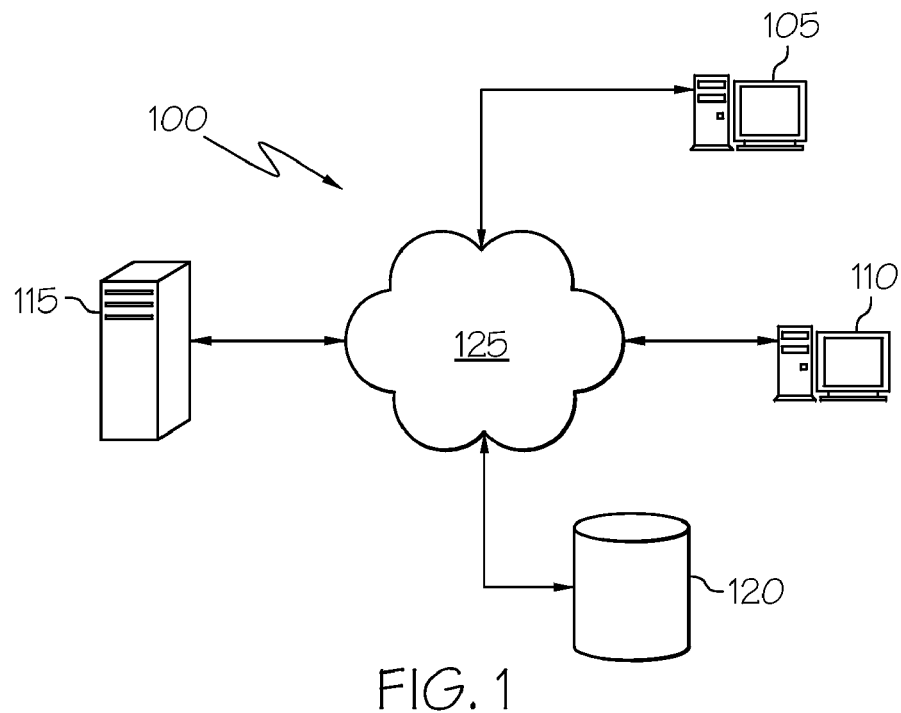
FIG. 1 is an exemplary computer network.

Additionally, the SUPG is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
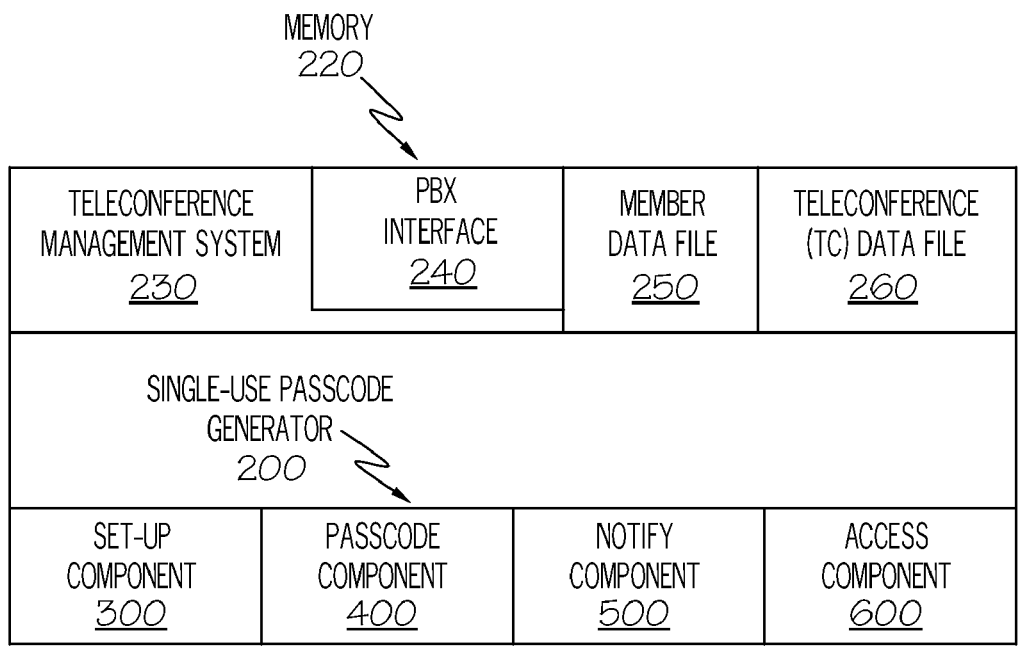
FIG. 2 describes programs and files in a memory on a computer.

SUPG 200 typically is stored in a memory, represented schematically as memory 220 in FIG. 2. The term "memory," as used herein, includes without limitation any volatile or persistent medium, such as an electrical circuit, magnetic disk, or optical disk in which a computer can store data or software for any duration. A single memory may encompass and be distributed across a plurality of media. Further SUPG 200 may reside in more than one memory distributed across different computers, servers, logical partitions or other hardware devices. The elements depicted in memory 220 may be located in or distributed across separate memories in any combination, and SUPG 200 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular importance to SUPG 200, memory 220 may include teleconference management system 230, member data file 250 and teleconference data file 260 with which SUPG 200 interacts. PBX interface 240 is a sub-component of teleconference management system 230. SUPG 200 comprises set-up component 300, passcode component 400, notify component 500, and access component 600.

Teleconference management system 230 and PBX interface 240 are prior art programs that perform all functions necessary to set-up and operate a teleconference. PBX interface enables teleconference management system 230 to interact with the hardware managing a teleconference. In a preferred embodiment, SUPG 200 integrates seamlessly with existing functions of teleconference management system 230 to enhance the functionality known in the art. Specifically, set-up component 300 utilizes current user interfaces for setting up a teleconference; notify component 500 complements existing automated methods of sending teleconference invitations; and access component 600 enhances existing passcode validation mechanisms known in the art.

Figure 3:
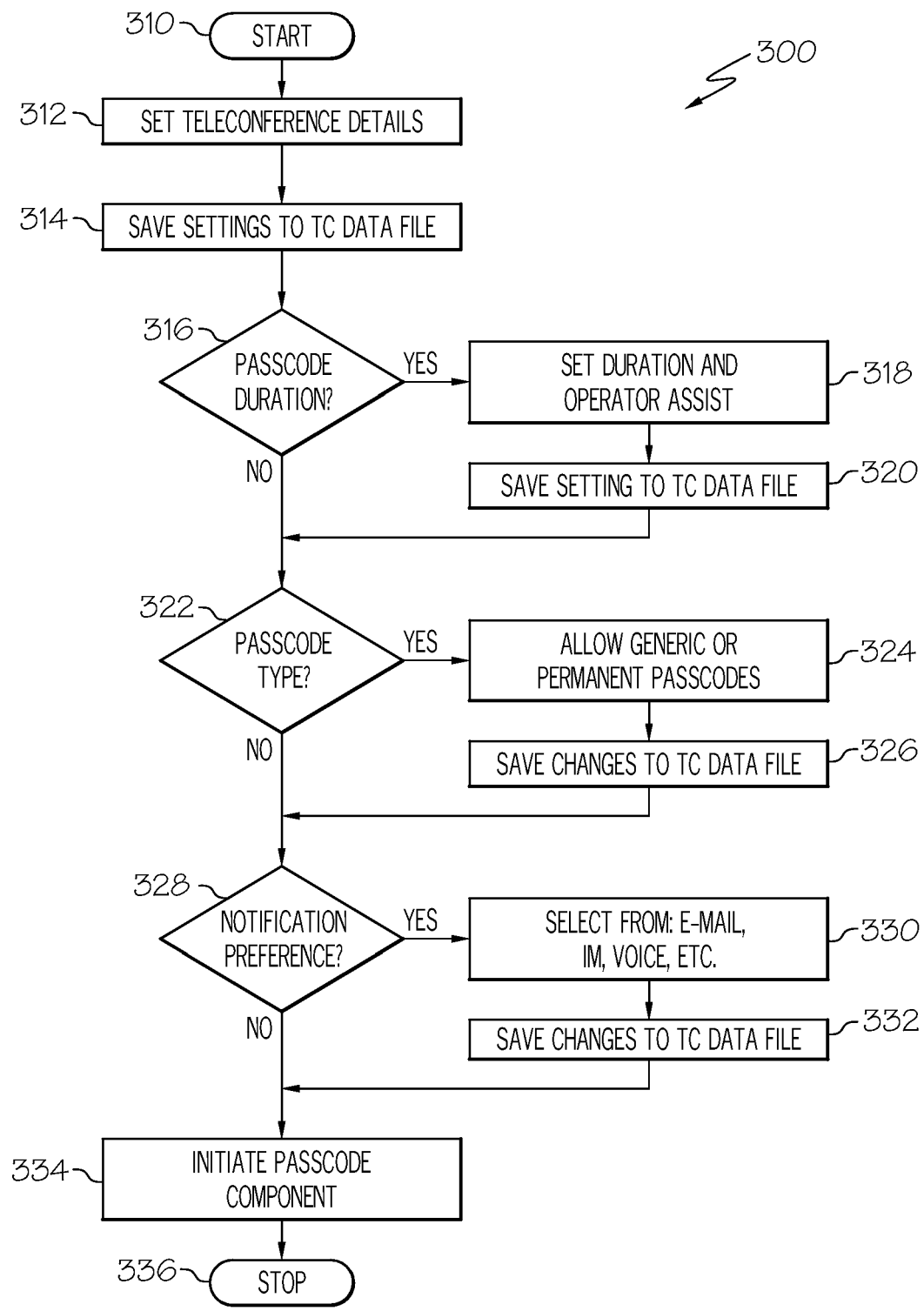
FIG. 3 is a flowchart of a set-up component.

As shown in FIG. 3, set-up component 300 starts whenever a host accesses a third party provider to schedule a teleconference (310). Commonly, the third party provider uses an Internet-based user interface for teleconference scheduling. The host sets initial teleconference details, such as the date, time, and the invitees (312). Set-up component 300 saves the settings to teleconference data file 260 (314). The host may choose whether to set passcode duration options (316). If yes, the host sets passcode duration options such as: whether participants be allowed to access the conference only at the beginning or throughout the duration of the teleconference; whether to extend access times to include pre-conference and post-conference discussions; whether to allow reconnection if a participant leaves or a call is dropped; and whether to require operator assistance for reconnection (318). Set-up component 300 saves the passcode duration settings to teleconference data file 260 (320). The host may choose whether to set passcode type options (322). If yes, the host selects passcode type options such as: whether to allow participants with permanent personal passcodes to access the conference with their permanent passcodes; and whether to use a generic passcode for some participants (324). Set-up component 300 saves the passcode type settings to teleconference data file 260 (326). The host may choose whether to set notification preferences (328). If yes, the host selects notification preferences such as: notification by e-mail, notification to an integrated calendar such as LOTUS NOTES or OUTLOOK EXCHANGE, notification by an instant message to a computer, notification by a text message to a cellular phone, or notification by voice mail (330). Notification settings can be identical for all invited participants, or a custom notification method can be used for each invited participant. Further, previously registered participants with personal permanent passcodes may already have a notification preference saved in member data file 240. Set-up component 300 saves the notification preference settings to teleconference data file 260 (332). Set-up component 300 initiates passcode component 400 (334) and stops (336).

Figure 4:
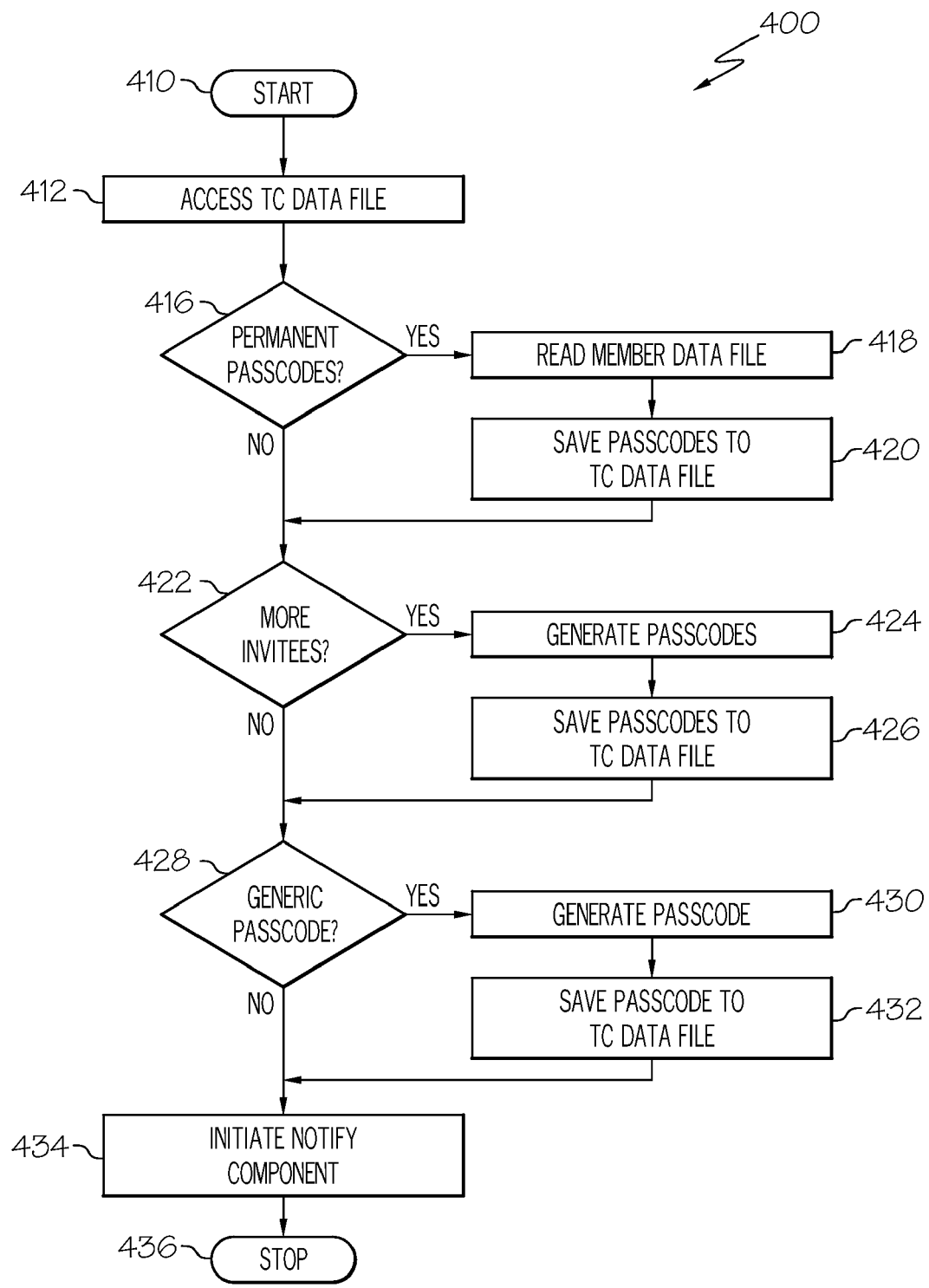
FIG. 4 is a flowchart of a passcode component.

Passcode component 400 starts when initiated by set-up component 300 (410), as shown in FIG. 4. Passcode component 400 accesses teleconference data file 260. Passcode component 400 determines if permanent passcodes are permitted for accessing the teleconference (416). If permanent passcodes are permitted, Passcode component 400 reads permanent passcodes from member data file 250 for each invited participant who has previously registered with the third party provider (418), and saves the passcodes to teleconference data file 260 (420). Passcode component 400 determines if more invitees need passcodes (422). More invitees may need passcodes because there are invitees that were not previously registered, or because the host requires all invitees to use single-use passcodes for the teleconference. If more invitees need passcodes, Passcode component 400 generates unique, random passcodes for each participant without a passcode (424), and saves the passcodes to teleconference data file 260 (426). The passcode generation algorithm can use a mechanism to prevent duplicates of the same passcode. Passcode component 400 determines if a generic passcode is requested (428). If a generic passcode is requested, Passcode component 400 generates a generic passcode (430), and saves the generic passcode to teleconference data file 260 (432). Once all passcodes are generated and saved, passcode component initiates notify component 500 (434) and stops (436).

Figure 5:
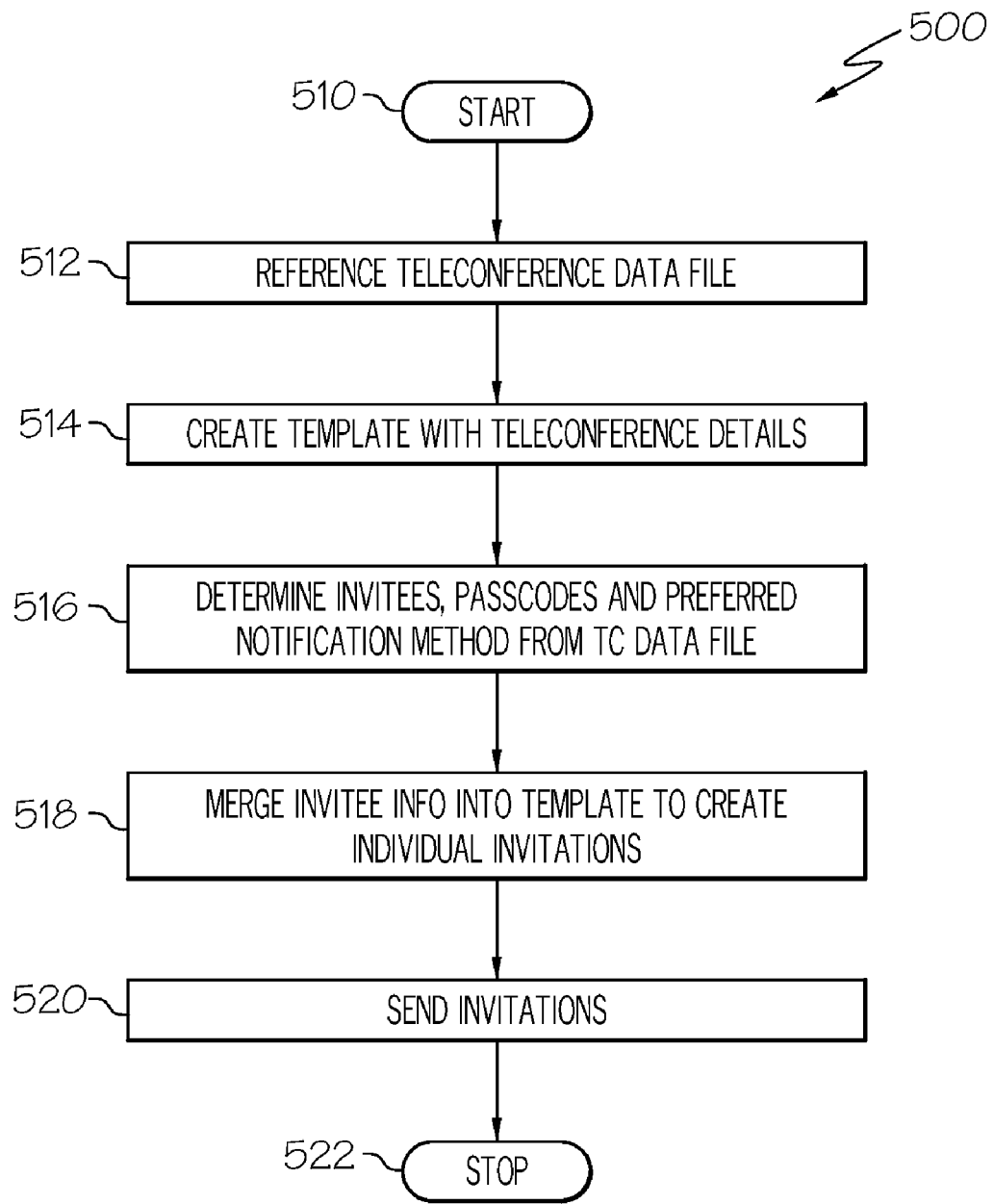
FIG. 5 is a flowchart of a notify component.

Notify component 500 starts when initiated by passcode component 400 (510), as shown in FIG. 5. Notify component 500 references teleconference data file 260 (512) and creates a template with the teleconference date, time, phone number, and may also contain other instructions for the teleconference (514). Notify component 500 determines invitees, passcodes and notification methods from teleconference data file 260 (516), and merges the invitee information into the template to create individual invitations for each invitee (518). Notify component 500 sends the invitations (520) and stops (522). As mentioned above, other than merging the unique passcodes, the functions of notify component 500 exist in the art.

In an alternate embodiment, notify component 500 sends a notification to the host with details about the notification of each invitee. If a generic passcode is used, the host's notification may include a generic invitation containing the generic passcode for the host to cut and paste into other formats for sending to other invitees.

Figure 6:
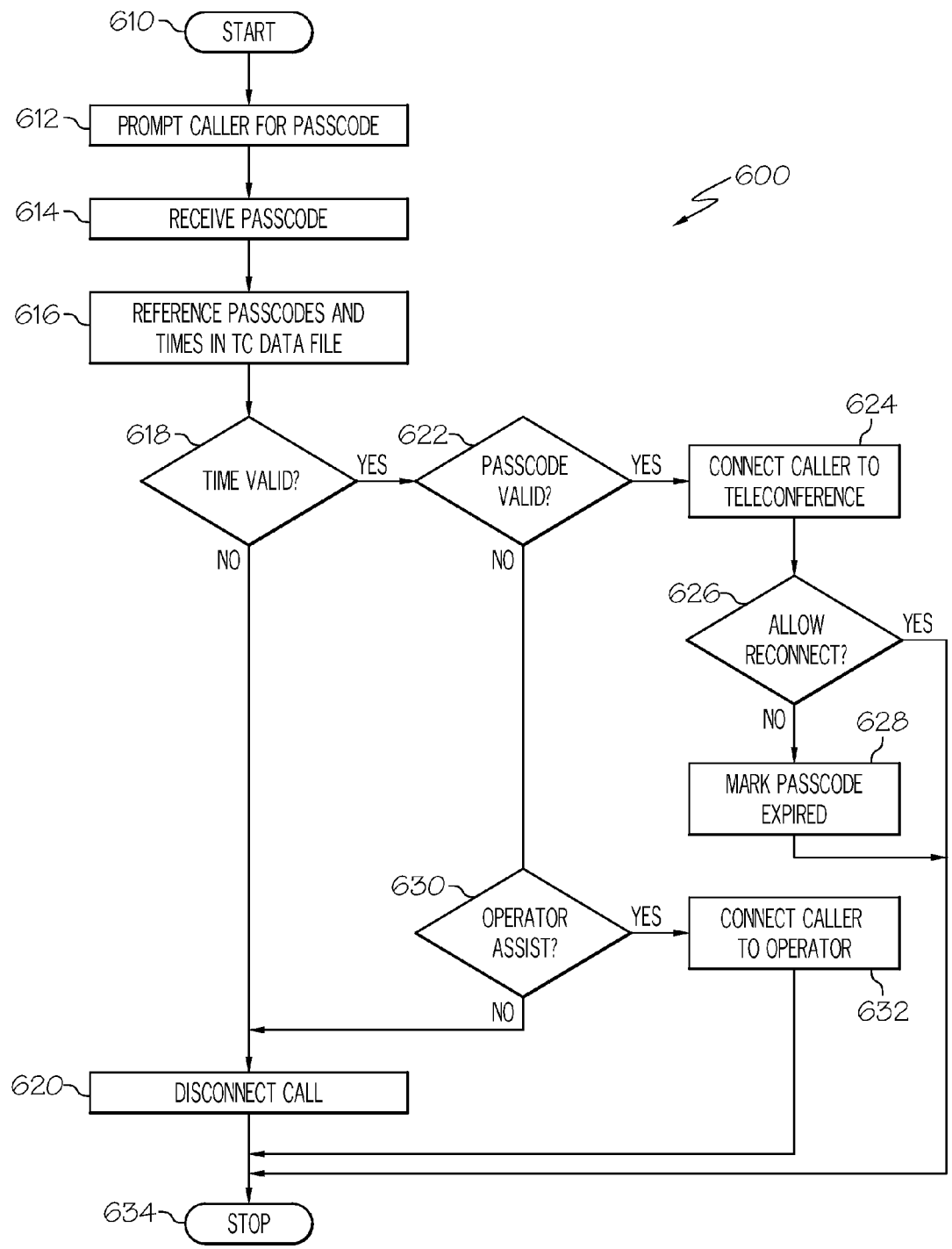
FIG. 6 is a flowchart of an access component.

Access component 600 starts whenever teleconference management system 230, coupled with PBX interface 240, receives an incoming call (610) as shown in FIG. 6. Access component 600 prompts caller for a passcode (612). Access component 600 receives the entered passcode (614) and references the passcodes and passcode duration settings from teleconference data file 260 (616). Access component 600 compares the current time with the passcode duration settings (618). If the time is not valid, access component 600 disconnects the call (620) and stops (634). If the time is valid, access component 600 compares the passcode with the passcodes listed in teleconference data file 260 (622). If the passcode is valid, access component 600 connects the caller to the teleconference (624). Once the caller is connected, access component 600 determines if reconnection is allowed (626). If reconnection is not allowed, access component 600 marks the used passcode as expired in teleconference data file 260 (628). After determining the reconnect settings for a connected caller, access component stops (634). If the passcode was not valid, access component 600 determines if operator assist is allowed (630). A passcode can be invalid because it has expired or has already been used by someone else. If operator assist is allowed, access component 600 connects the caller to an operator (632) and stops (634). The operator assist function is available to help overcome problems associated with invalid passwords, particularly associated with late connections or reconnections due to dropped calls. The operator can compare information from teleconference data file 260, and can consult with the host for clarification. If operator assist is not allowed, access component 600 disconnects the caller (620) and stops (634). Access component 600 runs through steps 610-634 for each incoming call.

Other embodiments and features, not shown in the figures, may also be included with SUPG 200. For example, the host can customize passcode duration by invitee, allowing certain participants to call in late or reconnect without operator assistance. The host can cause all passcodes to expire at the end of the call-in period if no late connections are allowed. Other advanced features include comparing invitee's caller ID to a pre-designated number for added security, or tracking incoming caller IDs and prohibiting reconnection with same passcode from a different phone. Teleconference management system 230 can use the unique passcodes from SUPG 200 as part of an automated roll-call procedure.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for increasing security of teleconferences, the method comprising:
   a computer receiving a request to set up a teleconference, wherein the request is received from a host accessing a teleconference management system coupled with hardware necessary to facilitate the teleconference;
   the computer receiving a list of invitees to participate in the teleconference;
   the computer assigning a unique, single-use passcode to an invitee on the list of invitees, wherein the invitee has the permanent personal passcode assigned by the teleconference management system previous to the teleconference;
   the computer sending an invitation to the invitee containing the unique, single-use passcode;
   the computer setting a time duration before the invitee calls into the teleconference defining when the unique, single-use passcode is valid for accessing the teleconference, wherein the time duration is a window of time that occurs within a time period that starts at a beginning of a pre-conference dial-in period and ends at an ending of the teleconference;
   the computer granting the invitee access to the teleconference in response to receiving the unique, single-use passcode for the invitee during the time duration;
   the computer determining whether the invitee is allowed to reconnect to the teleconference using the unique, single-use passcode;
   the computer, responsive to determining that the invitee is not allowed to reconnect to the teleconference and to detecting the invitee accessing the teleconference, expiring the unique, single-use passcode; and
   the computer, responsive to determining that permanent personal passcodes are allowed for accessing the teleconference, granting the invitee access to the teleconference in response to receiving a permanent personal passcode for the invitee during the time duration.

2. The method of Claim 1 further comprising the computer, responsive to determining that a generic passcode is assigned to the invitee and to receiving the generic passcode for the invitee during the time duration, allowing the invitee to access the teleconference, wherein the generic passcode is assigned to some of the invitees.

3. The method of claim 1 further comprising the computer generating a generic passcode for a participant not included in the list of invitees, wherein the generic passcode expires at a designated time.

4. The method of claim 3 further comprising the computer, responsive to receiving the generic passcode for the participant, granting the participant access to the teleconference.

5. The method of claim 1 wherein the time period further comprises pre-conference and post-conference discussions.

6. The method of claim 1 further comprising the computer performing an automated roll call for a plurality of users, each of the users having a different unique, single-use passcode.

7. A computer system for increasing security of teleconferences, the computer system comprising:
   one or more, processors in communication with one or more computer-readable memories, the one or more processors configured to execute program instructions stored on at least one of the one or more computer-readable memories, the program instructions comprising:
   program instructions, stored on at least one of the one or more memories, to manage hardware necessary to facilitate a teleconference;
   program instructions, stored on at least one of the one or more memories, to receive a request from a host to set up the teleconference;
   program instructions, stored on at least one of the one or more memories, to receive a list of invitees to participate in the teleconference;
   program instructions, stored on at least one of the one or more memories, to, for an invitee on the list of invitees, assign a unique, single-use passcode;

program instructions, stored on at least one of the one or more memories, to send an invitation to the invitee containing the unique, single-use passcode for that invitee;

program instructions, stored on at least one of the one or more memories, to set a time duration before the invitee calls into the teleconference, wherein the time duration defines when the unique, single-use passcode is valid for accessing the teleconference, and wherein the time duration is a window of time that occurs within a time period that starts at a beginning of a pre-conference dial-in period and ends at an ending of the teleconference;

program instructions, stored on at least one of the one or more memories, to grant the invitee access to the teleconference in response to receiving the unique, single-use passcode for the invitee during the time duration;

program instructions, stored on at least one of the one or more memories, to, responsive to determining that the invitee is allowed to reconnect to the teleconference and to the time duration ending, expire the unique, single-use passcode;

program instructions, stored on at least one of the one or more memories, to, responsive to determining that the invitee is not allowed to reconnect to the teleconference and to detecting the invitee accessing the teleconference, expire the unique, single-use passcode; and program instructions, stored on at least one of the one or more memories, to, responsive to determining that permanent personal passcodes are allowed for accessing the teleconference and to receiving a permanent personal passcode for the invitee during the time duration, grant the invitee access to the teleconference.

8. The computer system of claim 7 further comprising:
program instructions, stored on the one or more memories, to assign each invitee from the list of invitees the permanent personal passcode previous to the teleconference.

9. The computer system of claim 7 further comprising:
program instructions, stored on at least one of the one or more memories, to, responsive to determining that a generic passcode is assigned to the invitee and to receiving the generic passcode assigned to the invitee during the time duration, allow the invitee to access the teleconference, wherein the generic passcode is assigned to some of the invitees.

10. The computer system of claim 7 further comprising:
program instructions, stored on at least one of the one or more memories, to generate a generic passcode for a participant not included in the list of invitees, wherein the generic passcode expires at a designated time.

11. The computer system of claim 10 further comprising:
program instructions, stored on at least one of the one or more memories, to grant access to the teleconference to the participant in response to receiving the generic passcode for the participant.

12. The computer system of claim 7 wherein the program instructions to set the time duration before the invitee calls into the teleconference set the window of time to include pre-conference and post-conference discussions.

13. A memory storing program instructions which, when executed by a processor, increase security of teleconferences, the program instructions comprising:
program instructions to instruct the processor to receive a request to set up a teleconference, wherein the request is received from a host accessing a teleconference management system coupled with hardware necessary to facilitate the teleconference;

program instructions to instruct the processor to receive a list of invitees to participate in the teleconference;

program instructions to instruct the processor to assign a unique, single-use passcode to an invitee on the list of invitees;

program instructions to instruct the processor to send an invitation to the invitee containing the unique, single-use passcode;

program instructions to instruct the processor to set a time duration before the invitee calls into the teleconference, wherein the time duration defines when the unique, single-use passcode is valid for accessing the teleconference, and wherein the time duration is a window of time that occurs within a time period that starts at a beginning of a pre-conference dial-in period and ends at an ending of the teleconference;

program instructions to instruct the processor to grant the invitee access to the teleconference in response to receiving the unique, single-use passcode for the invitee during the time duration;

program instructions to instruct the processor, to, responsive to determining that the invitee is allowed to reconnect to the teleconference and to the time duration ending, expire the unique, single-use passcode;

program instructions to instruct the processor, to, responsive to determining that the invitee is not allowed to reconnect to the teleconference and to detecting the invitee accessing the teleconference, expire the unique, single-use passcode; and program instructions to instruct the processor, to, responsive to determining that permanent personal passcodes are allowed for accessing the teleconference and to receiving a permanent personal passcode for the invitee during the time duration, grant the invitee access to the teleconference.

14. The memory of claim 13 further comprising program instructions, stored in the memory, to instruct the processor to assign the invitee the permanent personal passcode previous to the teleconference.

15. The memory of claim 13 further comprising program instructions, stored in the memory, to instruct the processor, to, responsive to determining that a generic passcode is assigned to the invitee and to receiving the generic passcode assigned to the invitee during the time duration, allow the invitee to access the teleconference, wherein the generic passcode is assigned to some of the invitees.

16. The memory of Claim 13 further comprising program instructions, stored in the memory, to instruct the processor to generate a generic passcode for a participant not included in the list of invitees, wherein the generic passcode expires at a designated time.

17. The memory of Claim 16 further comprising program instructions, stored in the memory, to instruct the processor to grant access to the teleconference to the participant in response to the participant entering the generic passcode.

18. The memory of claim 13 wherein the program instructions, stored in the memory, to instruct the processor to set the time duration before the invitee calls into the teleconference set the window of time to include pre-conference and post-conference discussions.

19. The memory of Claim 13 further comprising program instructions, stored in the memory, to instruct the processor to perform an automated roll call using the unique, single-use passcode for the invitee.

* * * * *